United States Patent [19]
Kaleniecki

[11] Patent Number: 5,716,080
[45] Date of Patent: Feb. 10, 1998

[54] BEARINGLESS FLUID COUPLER

[76] Inventor: James F. Kaleniecki, 701 Townsend, Leonard, Mich. 48367

[21] Appl. No.: 688,409

[22] Filed: Jul. 30, 1996

[51] Int. Cl.$^6$ ............................................. F16L 27/00
[52] U.S. Cl. .................................. 285/279; 285/352
[58] Field of Search ............................. 285/279, 281, 285/282, 351, 352, 375

[56] References Cited

U.S. PATENT DOCUMENTS

| | | | |
|---|---|---|---|
| 1,303,714 | 5/1919 | O'Brien | 285/279 |
| 2,653,041 | 9/1953 | Wilson | 285/94 |
| 2,723,136 | 11/1955 | Deubler | 285/110 |
| 2,805,086 | 9/1957 | Shumaker | 285/279 X |
| 3,002,769 | 10/1961 | Deubler et al. | 285/39 |
| 3,273,592 | 9/1966 | Deubler et al. | 137/624.13 |
| 3,405,959 | 10/1968 | Walker | 285/276 |
| 3,449,001 | 6/1969 | Mullion | 285/279 |
| 3,889,983 | 6/1975 | Freize et al. | 285/13 |
| 4,296,952 | 10/1981 | McCracken | 285/98 |
| 4,632,431 | 12/1986 | McCracken | 285/13 |
| 4,817,995 | 4/1989 | Deubler et al. | 285/98 |
| 4,928,997 | 5/1990 | Reisener et al. | 285/13 |
| 5,174,614 | 12/1992 | Kaleniecki | 285/279 |
| 5,533,762 | 7/1996 | Carmona | 285/375 X |
| 5,577,775 | 11/1996 | Pearson et al. | 285/279 X |

*Primary Examiner*—John A. Ricci
*Attorney, Agent, or Firm*—Harness, Dickey & Pierce, P.L.C.

[57] ABSTRACT

A bearingless, mechanical, rotary, fluid-tight coupling apparatus for effecting a fluid-tight seal between a non-rotating member such as a fluid supply line and a rotating member, such as a spindle, of a flexible machine tool. The apparatus includes a guide member having an axially extendable and retractable plunger. The plunger has a polygonal-shaped shoulder portion protruding therefrom which is moveable slidably, axially within a polygonal-shaped recess formed in the guide member of the apparatus. The polygonal-shaped recess and polygonal-shaped shoulder portion operate cooperatively to allow the plunger to be retracted as needed when the spindle of the machine tool retracts to permit changing of a tool secured to the spindle, while permitting a slight degree of misalignment of the spindle relative to the apparatus without affecting the fluid-tight seal therebetween. The apparatus is particularly well adapted to be used with flexible machine tools which require the spindle thereof to move axially a limited distance when a tool secured to the spindle is to be changed.

17 Claims, 4 Drawing Sheets

BEARINGLESS FLUID COUPLER

BACKGROUND OF THE INVENTION

1. Technical Field

This invention relates to a fluid coupling assembly, and more particularly to a bearingless, fluid coupling apparatus for coupling a non-rotating fluid supply line to a rotating member such as a spindle, and which further permits a small degree of axial misalignment of the spindle relative to the coupling apparatus without effecting the fluid-tight seal formed between the coupling apparatus and the spindle.

2. Discussion

Fluid coupling assemblies are used in a wide variety of machining applications to couple fluid supply lines to machine tools which require a continuous, or substantially continuous, supply of fluid for cooling and/or lubricating. Such purposes might include lubricating various machine tools such as drill bits, grinding bits, rasps, etc.

In the past, most fluid coupling devices have been used with varying degrees of success to provide fluid from a non-rotating fluid supply line to a rotating member, such as a spindle, of a machine tool. Problems with many prior-developed fluid couplings were caused by vibration experienced by the rotating member, such as the spindle of a machine tool, which caused premature failure of the bearings within previously developed fluid couplings. Additionally, a slight axial misalignment of the spindle relative to the fluid coupling created instances where unacceptably high axial loads were imparted to the bearings within the fluid coupling, thereby over-stressing the bearings and causing premature bearing failure. Accordingly, previously developed fluid couplings which incorporated interior bearings suffered from a number of drawbacks which eliminated their effectiveness, durability, and overall life expectancy.

A fluid coupling which overcame the above described problems and drawbacks is disclosed in U.S. Pat. No. 5,174,614, entitled "Bearingless Mechanical Rotary Fluid Coupling", issued Dec. 29, 1992, and assigned to the assignee of the present application. This patent discloses a "bearingless", mechanical, rotary fluid coupling which does not include any internal bearings and which permits a small degree of axial misalignment between the coupling and a rotating spindle of a machine tool to which the coupling is secured without effecting the fluid-tight seal between the coupling and the spindle. This fluid-tight, bearingless coupling, since it is not mounted onto the spindle of the machine tool, also does not experience nearly the same degree of vibration experienced by the spindle, which further helps to prolong the longevity of the coupling.

More recently, flexible machine tooling has become popular. Flexible machine tooling refers to flexible machine tools which incorporate automatic tool changing apparatus for automatically changing a specific tool and replacing the tool with a different tool to perform a different function. Thus, with flexible machine tools, one machine tool can perform several machining functions, for example, drilling, grinding, rasping, etc., all from one computer-controlled machine tool.

With the increasing popularity of flexible machining, the need has also grown for a fluid-tight coupling which is suitable for use with such machine tools. One requirement with flexible machine tools, however, is that the spindle of the machine tool must be allowed to move axially at least a small distance, typically on the order of about 0.25"–1.0", for the automatic tool changing apparatus to operate and automatically change a tool in the spindle. While the bearingless rotary fluid coupling disclosed in U.S. Pat. No. 5,174,614 is well suited to dedicated machine tools which only perform one function, and therefore which do not require the spindle of the tool to move axially to any significant degree, this fluid coupling does not allow the degree of axial movement necessary to permit an automatic tool changing apparatus of a machine tool to unload a tool from the spindle and replace the tool with a different tool. Accordingly, there exists a need for a durable, reliable, and yet simple bearingless, fluid-tight coupling apparatus which operates with a variety of flexible machine tools, and which permits a small degree of axial movement of the spindle of a flexible machine tool in order to allow specific tools of the machine tool to be replaced as needed.

It is therefore a principal object of the present invention to provide a fluid-tight coupling apparatus for coupling a fluid supply line to a rotating member, such as a spindle of a flexible machine tool, and for allowing a limited degree of travel of the spindle to permit tools to be automatically changed from the spindle.

It is a further object of the present invention to provide a bearingless, rotary, mechanical fluid-tight coupling apparatus which allows for a slight degree of axial misalignment of the spindle of a flexible machine tool relative to the coupling apparatus, and which further permits the spindle to be moved axially a limited distance without affecting the fluid-tight seal between the coupling apparatus and the spindle.

It is still another object of the present invention to provide a bearingless fluid coupling apparatus which is relatively simple in construction, more durable then bearing-type fluid coupling devices, and which permits a small degree of axial movement of the spindle of a machine tool to which it is in fluid coupling relation, while simultaneously permitting a small degree of axial misalignment of the spindle relative to the coupling apparatus without effecting the integrity of the fluid-tight seal formed therebetween.

SUMMARY OF THE INVENTION

The above and other objects are accomplished by a bearingless, rotary, mechanical, fluid-tight coupling apparatus in accordance with preferred embodiments of the present invention. In one preferred embodiment the apparatus includes a main body and a guide portion adapted to be secured together. The main body includes an end portion which is further adapted to be secured to a fluid supply line for supplying fluid to and through the coupling. The main body includes a bore formed completely therethrough and a recess at one end thereof. The guide portion also includes a bore therethrough with a polygonal-shaped recess formed therein. An elongated plunger having a polygonal-shaped shoulder portion is positioned partially within the guide portion such that a first end of the plunger is coaxially aligned with the bore in the guide portion. The polygonal-shaped shoulder on the plunger is further dimensioned such that it is able to fit within the polygonal-shaped recess in the guide portion and to move longitudinally, slidably within the guide portion. A spring is provided for biasing the plunger toward an extended position.

In a preferred embodiment the polygonal-shaped shoulder of the plunger has rounded off corners. The rounded off corners help to facilitate a slight degree of axial play when the polygonal-shaped shoulder is residing within the polygonal-shaped recess of the guide portion. The small degree of axial play accommodates a small degree of axial misalignment of the spindle of a machine tool when the spindle is in fluid coupling relation with the first end of the plunger to therefore maintain a fluid-tight seal between the coupling apparatus and the spindle regardless of a slight degree of axial misalignment between the two. The polygonal shape of the shoulder and recess further prevent rotation of the plunger within the guide portion.

In one preferred embodiment the polygonal-shaped shoulder comprises a generally square shape, while the polygonal-shaped recess in the guide portion comprises a generally square shape having overall dimensions just slightly greater than those of the shoulder to permit axial, sliding movement of the shoulder within the recess.

The fluid coupling apparatus of the present invention therefore provides a means for coupling a non-rotating fluid supply line to a rotating spindle, and further for permitting movement of the spindle axially to allow an automatic tool changing apparatus of the machine tool associated with the spindle to change the specific tool held in the spindle as needed. The apparatus of the present invention further accomplishes this fluid-tight coupling to the spindle without the need for any bearings within the coupling apparatus, and further in a manner which permits a small degree of axial misalignment of the spindle relative to the plunger of the apparatus without effecting the integrity of the fluid-tight seal with the spindle.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
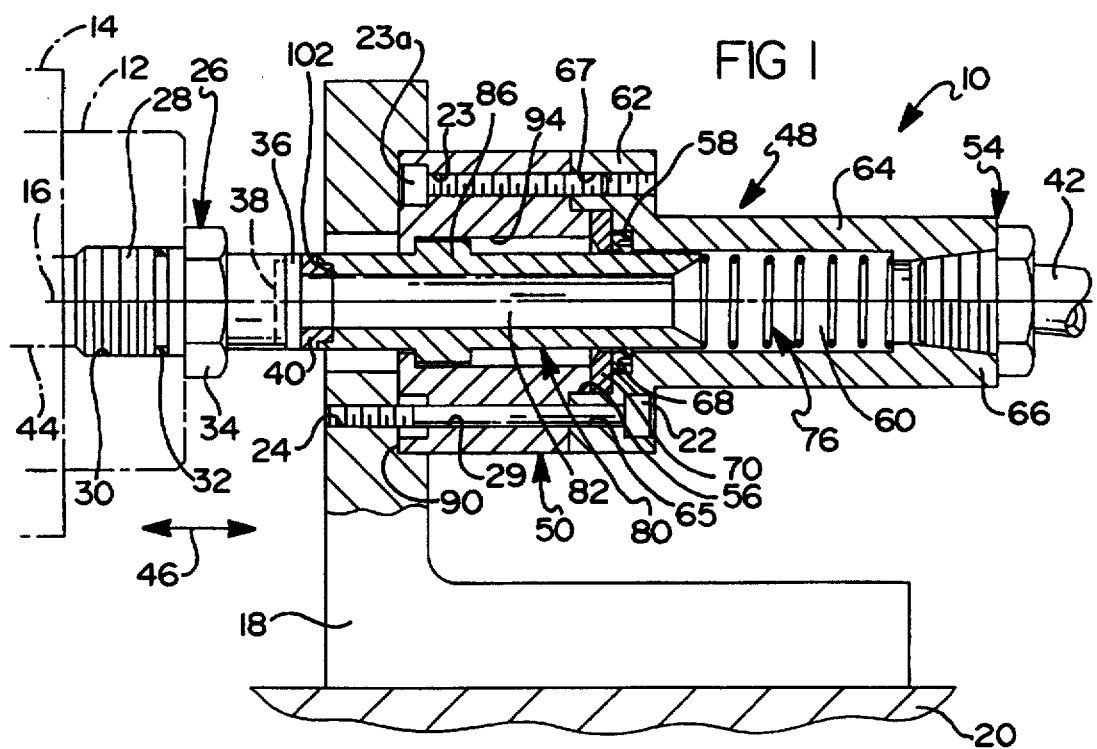
FIG. 1 is a side view showing the bearingless, fluid coupling apparatus of the present invention secured to a spindle of a machine tool and supported in fluid-tight relationship with the spindle by an external mounting bracket.

Referring to FIG. 1, there is shown a bearingless, mechanical, rotary, fluid coupling apparatus 10 coupled to a spindle 12 of a flexible machine tool 14. The apparatus 10 is supported in general axial alignment with the axis of rotation 16 of the spindle 12 by a conventional bracket member 18 which is in turn secured to a support surface 20. The apparatus 10 may be secured to the bracket member 18 by a plurality of threaded screws 22 which extend through the apparatus 10 and into the threaded apertures 24 in the bracket member 18.

The apparatus 10 is coupled to the spindle 12 via a rotator assembly 26. The rotator assembly 26 has a threaded end 28 which is threadably engaged within a threaded recess 30 in the spindle 12. An O-ring seal 32 adjacent the threaded end 28 helps to provide a fluid-tight seal between the threaded end 28 and the threaded recess 30. The rotator assembly 26 further includes an annular shoulder 34 for enabling an external tool or wrench to be used to threadably advance the rotator assembly 26 into the threaded recess 30.

With further reference to FIG. 1, a seal member 36 is positioned within a recess 38 in the rotator assembly 26. The seal member 36 is comprised of a material which provides longwear, and preferably comprised of a material such as tungsten carbide and silicon carbide. Diamond or ceramics could also be employed. The face of the seal member 36 is further micro-lapped to maintain a substantially perfect mating seal with a cooperating seal member 40. The face of seal member 40 is also micro-lapped and seal member 40 is preferably formed from a material which provides longwear, such as carbon graphite. It will be appreciated, however, that the materials of the seal members 36 and 40 could be interchanged. The micro-lapping of the faces of the seal members 36 and 40 essentially evacuates the space between the faces to form an axially gapless interface which substantially effects a hydraulic suction. It is also preferred that a high graphic based lubricant be applied to the seal member 36 face prior to the first use of the apparatus 10. While such a lubricant is not needed after an initial, very short run time, if the apparatus 10 is operated without a fluid source immediately after installation, the lubricant helps to insure a good break-in between the face surfaces of the seal members 36 and 40. After the initial, short break-in period, the apparatus 10 may even be used without a source of fluid passing therethrough.

With continuing reference to FIG. 1, fluid is supplied to and through the apparatus 10 by a conventional fluid line 42. Fluid line 42 may comprise a flexible hose, a metal conduit or any other tubular type of member suitable for supplying a lubricant to the spindle 12. The spindle 12 includes a bore 44 from which fluid passing through the apparatus 10 enters and is eventually discharged adjacent the cutting tool (not shown)

Since the machine tool 14 is of the "flexible" type, it will have an automatic tool changing apparatus (not shown) which automatically retracts the spindle 12 slightly in order to effect changing of a tool secured to the spindle 12. Thus, spindle 12 must be allowed to move axially in the directions indicated by arrow 46 to a limited degree, and preferably at least about 0.125 inch. It is anticipated that most flexible machine tools having associated automatic tool changers will require slightly more spindle travel, and typically about 0.250 inch–0.750 inch in order to accomplish changing of tools secured to the spindle 12. The apparatus 10 is not limited, however, to use with flexible machine tools. Accordingly, the apparatus 10 could be used with virtually any type of tool having a spindle which must be moved axially from time to time, and which also requires a lubricating fluid to be supplied thereto.

Figure 2:
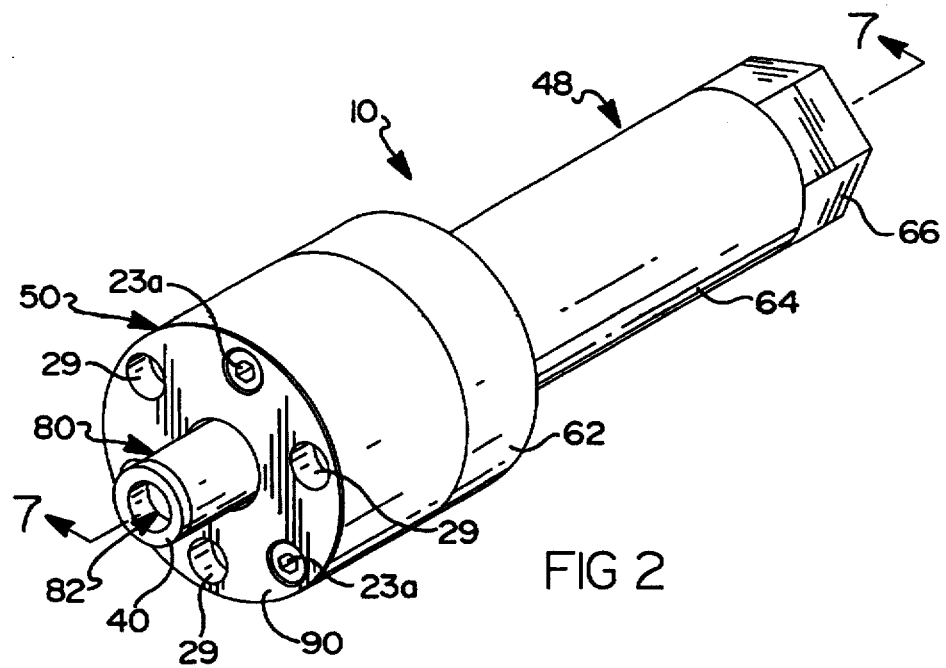
FIG. 2 is a perspective view of the fluid coupling apparatus of the present invention.
Figure 3:
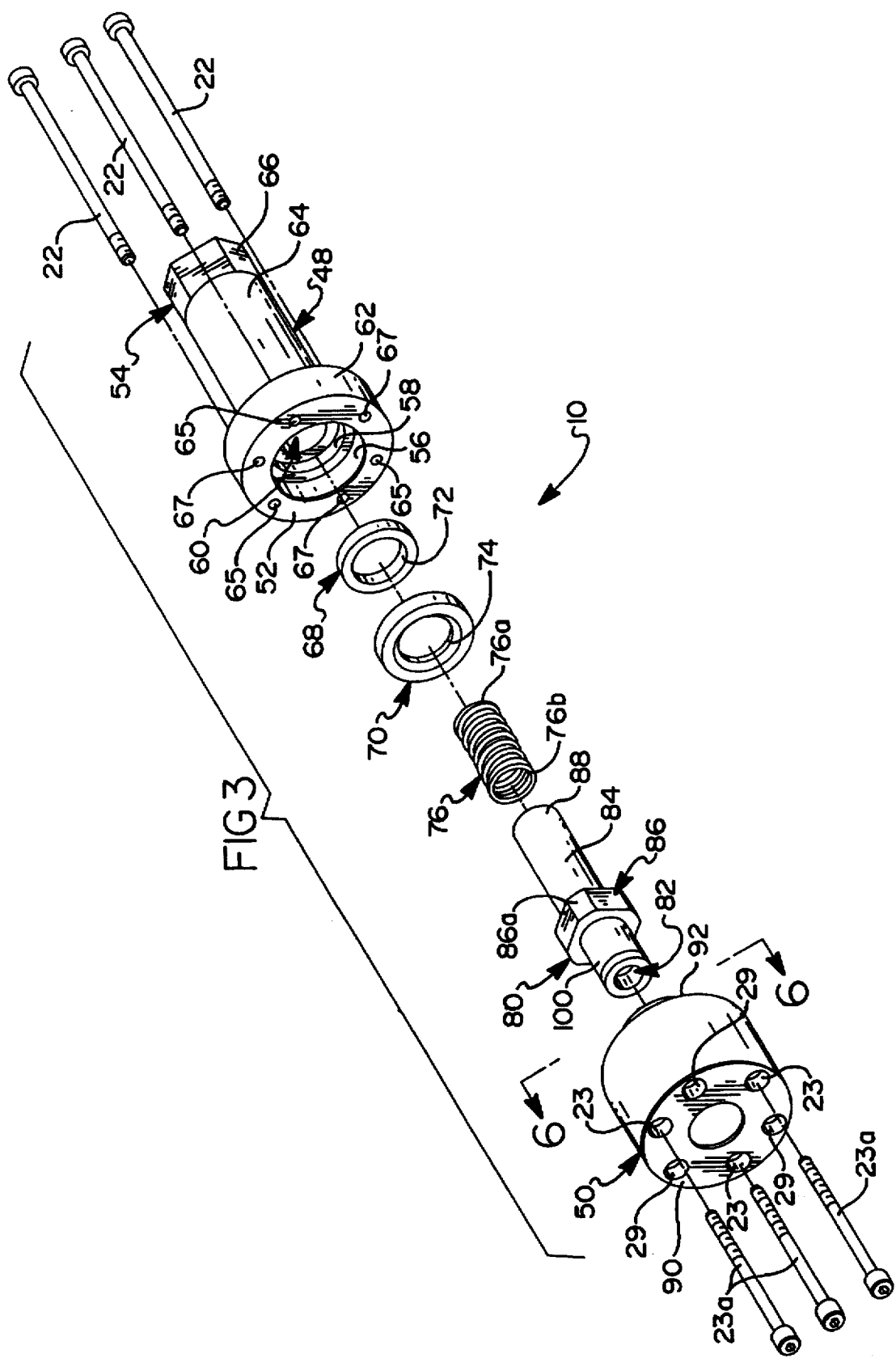
FIG. 3 is an exploded perspective view of the fluid coupling apparatus.
Figure 4:
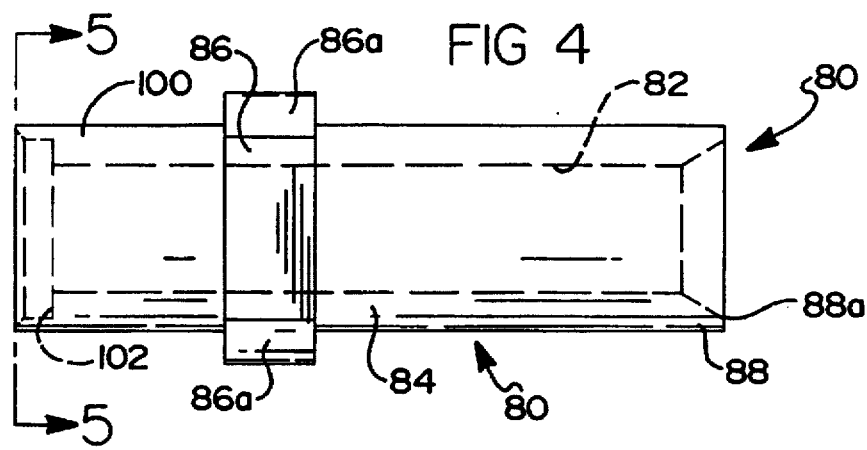
FIG. 4 is a side, elevational view of the elongated plunger of the apparatus.
Figure 5:
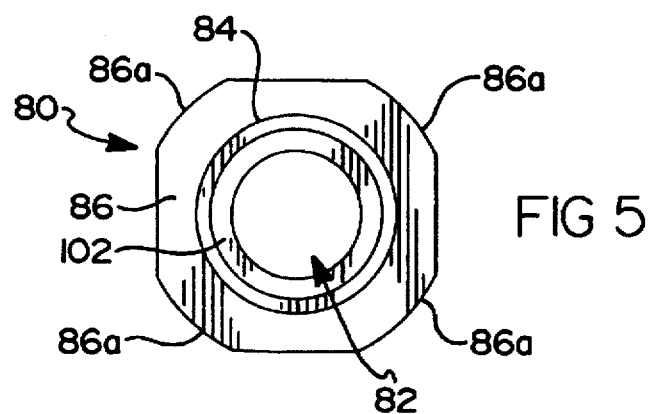
FIG. 5 is an end view of the plunger of FIG. 4 taken in accordance with directional line 5—5 in FIG. 4.

Referring now to FIGS. 2 and 3, the apparatus 10 is shown in greater detail. The bearingless coupling apparatus 10 generally includes a main body 48 which is releasably secured to a guide portion 50 via a plurality of threaded screws 23a. Accordingly, the apparatus 10 is readily and easily disassembled, if needed, with only a single external tool such as an allen wrench, screwdriver, etc.

With specific reference to FIG. 3, the main body 48 has a first end 52 and a second end 54. The first end 52 includes a first recess 56 and a second recess 58 formed coaxially with a longitudinally extending bore 60 which extends completely through a housing portion 62, a neck portion 64 and a polygonal end portion 66. The housing portion 62 further includes a plurality of apertures 64 and a plurality of apertures 67. Apertures 67 permit securing of the guide portion 50 and main body 48 together via apertures 23 in the guide portion 50 by the threaded screws 23a. Threaded screws 22 permit the apparatus 10 to be secured to the bracket member 18 through apertures 64 in the main body 48 and apertures 29 in the guide member 50.

With further reference to FIG. 3, an elastomeric sealing ring 68 is included which fits snugly within the second recess 58. A steel sealing washer 70 is positioned in the first recess 56. The elastomeric sealing ring 68 has an aperture 72 and the sealing washer 70 has an aperture 74, each of which are sized to permit passage of a coil spring 76 therethrough and into the bore 60. With brief reference to FIG. 7, the neck portion 64 of the main body 48 includes a step portion 78 which abuts a first end portion 76a of the spring 76 when the spring 76 is slidably inserted fully into the main body 48.

With further reference to FIGS. 3 and 4–6, the apparatus 10 also includes an elongated, axial plunger 80. The plunger 80 includes a coaxial bore 82 extending through a central body portion 84 and a generally perpendicularly protruding polygonal shoulder portion 86 which completely circumscribes the central body portion 84. As illustrated particularly well in FIGS. 5 and 6, the polygonal-shaped shoulder portion 86 is formed in a generally square shape and includes rounded off corner portions 86a. The outer diameter of the central body portion 84 is further preferably just slightly smaller than the diameter of apertures 74 and 72 to permit a second end portion 88 to extend therethrough and partially into the bore 60. The spring 76 has a second end portion 76b which abuts an edge surface 88a (FIG. 4) of the plunger 80 to provide a biasing force against the plunger 80 to cause the plunger 80 to be urged outwardly of the main body 48.

Figure 6:
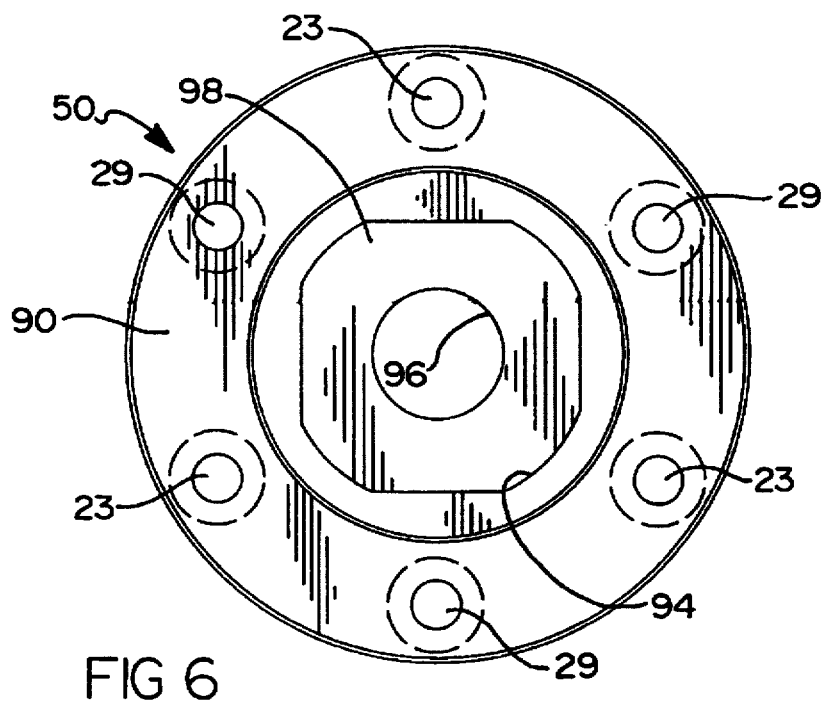
FIG. 6 is an end view of the guide portion of 6—6 in FIG 3.
Figure 7:
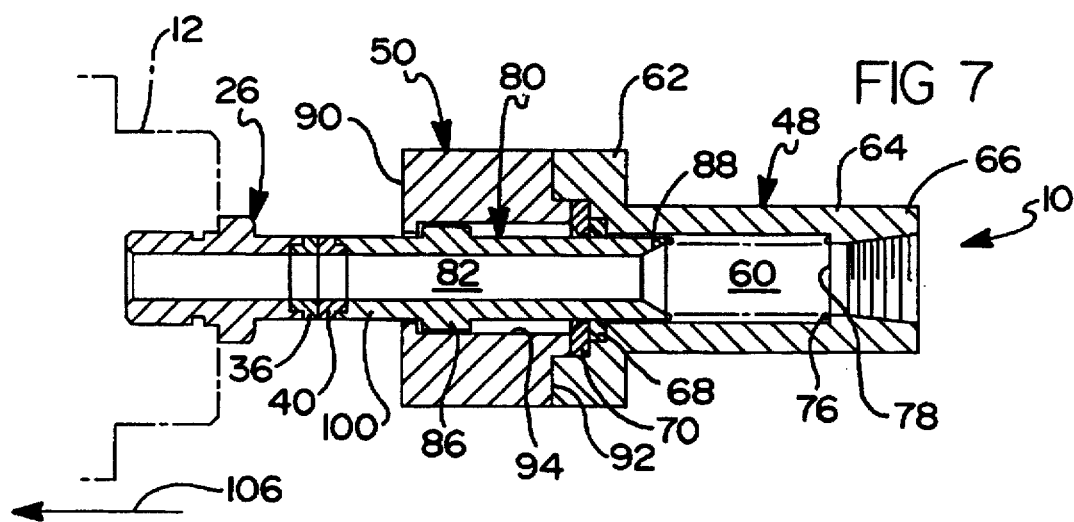
FIG. 7 is a cross-sectional side view of the coupling apparatus secured to the spindle of a flexible machine tool, with the elongated plunger of the apparatus in an almost fully extended position.

Referring now to FIGS. 3, 6 and 7, the guide portion 50 includes a first end 90 and a second end 92. A polygonal-shaped recess 94 (FIG. 6) is formed in the second end 92. The polygonal-shaped recess 94 is coaxially aligned with the axis of rotation of the spindle 12 and includes an aperture 96 formed in a bottom wall 98 of the recess 94. A plurality of apertures 100 are provided for permitting the guide portion 50 to be secured to the main body 48 via the external threaded screws and further to the bracket member 18 (FIG. 1).

With reference to FIG. 7, the polygonal-shaped recess 94 has inner dimensions just slightly larger than the outer dimensions of the polygonal-shaped shoulder portion 86. Since the recess 94 and the shoulder portion 86 are generally square shaped, the plunger 80 is not able to rotate within the guide portion 50. The plunger 80 is, however, permitted to move smoothly, longitudinally within the polygonal-shaped recess 94 as needed, as will be described further momentarily.

From FIG. 7 it will also be appreciated that a first end 100 of the plunger 80 includes a recess 102 which supports the seal member 40. The outer diameter of the central body portion 84 of the plunger 80 is further preferably just slightly smaller than the diameter of aperture 96 to permit the first end 100 to readily extend therethrough.

Figure 8:
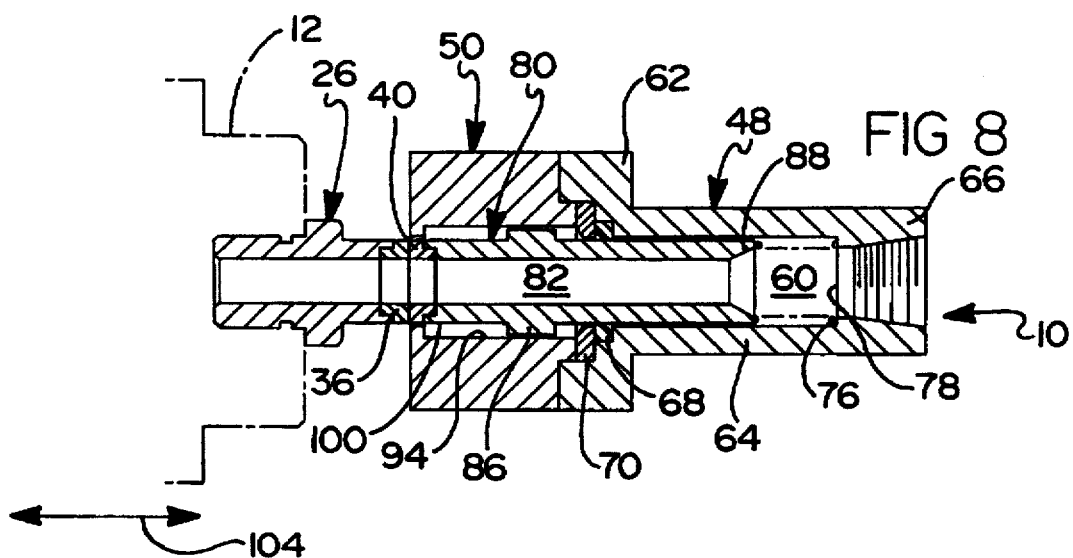
FIG. 8 is a cross-sectional side view of the coupling apparatus secured to the spindle of a flexible machine tool, with the plunger of the apparatus in a retracted position.

Referring now to FIGS. 7 and 8, the operation of the apparatus 10 will be described. When the coupling apparatus 10 is secured to the mounting bracket 18 and in operation with the machine tool 14 (FIG. 1), fluid will be supplied into and through the neck portion 64 of the main body 48, through the bore 82 of the plunger 80 and into the spindle 12 of the machine tool 14. In this position the spring 76 provides a biasing force which holds the seal member 40 at the first end 100 of the plunger 80 against the seal member 36 to effect a fluid-tight seal as the spindle 12 rotates. The plunger 80 does not rotate because the polygonal-shaped shoulder portion 86 is disposed within the polygonal-shaped recess 94.

Referring specifically to FIG. 8, when the tool coupled to the spindle 12 needs to be changed, the automatic tool changer (not shown) of the machine tool 14 causes the spindle 12 to be retracted (ie. moved in the direction of arrow 104) so that the tool may be removed from the spindle 12. The travel of the spindle 12 may vary significantly in length but, in most applications, will be within the range of about 0.125 inch–0.750 inch.

When the spindle 12 is retracted, the plunger 80 is urged in the direction of arrow 104 against the biasing force of the spring 76. This causes the second end 88 to be urged deeper into the neck portion 64. In this regard it will be appreciated that the length of travel of the spindle 12 will dictate the needed depth or overall length of the bore 60 and the depth of the polygonal recess 94. More specifically, the length of the bore 60 and the depth of the polygonal-shaped recess 94 most be sufficient to permit the plunger 80 to retract completely as needed to allow changing of the tool secured to the spindle 12.

Once the tool changing has been effected the spindle 12 is moved in the direction of arrow 106 in FIG. 7 and the plunger 80 is maintained in sealing engagement with the spindle 12 as the biasing force provided by the spring 76 simultaneously urges the plunger 80 in the direction of arrow 106.

It will also be appreciated that while the polygonal shoulder portion 86 of the plunger 80 and the polygonal-shaped recess 94 are formed in a generally square shape, that other shapes could be used with only a small degree of modification to the apparatus 10. For example, a triangular shaped shoulder portion on the plunger 80 and a triangular-recess in the guide portion 50 could be used. Diamond shapes, hexagonal, octagonal and other various shapes could be employed if desired. The important consideration is that the shoulder portion formed on the plunger 80 and the shape of the recess are such that the plunger 80 is not permitted to rotate relative to the guide portion 50.

Figure 9:
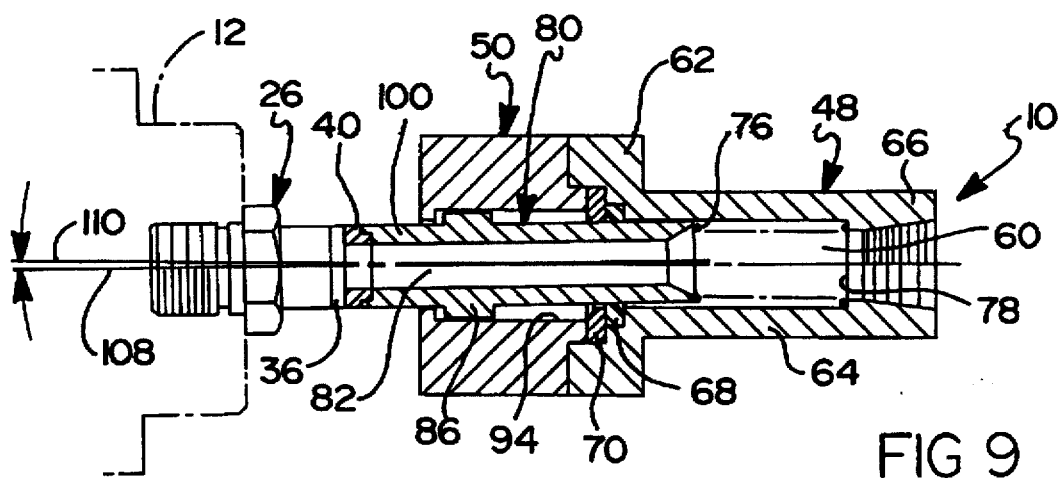
FIG. 9 is a cross-sectional side view of the coupling apparatus secured to a spindle illustrating a slight degree of axial misalignment of the spindle relative to the coupling apparatus which is permitted by the apparatus without effecting the integrity of the fluid-tight seal between the plunger and the spindle.

Referring now to FIG. 9, it can be seen how the apparatus 10 permits a slight degree of misalignment between the spindle 12 and the plunger 80 without affecting the integrity of the fluid-tight seal formed therebetween. The axis of the spindle 12 is designated by dashed line 108 while dashed line 110 represents an axis extending through the coaxial center of the apparatus 10. The rounded off corners 86a of the polygonal-shaped shoulder portion 86 of the plunger 80, as well as the slight clearance between the remaining surfaces of the shoulder portion 86 and the walls of the polygonal-shaped recess 94, permit a slight degree of axial movement of the plunger 80. This accommodates a slight degree of axial misalignment of the spindle 108 without affecting the integrity of the fluid-tight seal formed between the spindle seal member 36 and the seal member 40 of the plunger 80. Were it not for the apparatus 10 accommodating a slight degree of axial misalignment of the spindle 12, the integrity of the fluid-tight seal between the apparatus 10 and the spindle 12 could be negatively affected.

It will also be appreciated that while the apparatus 10 has been illustrated and described herein as accommodating a length of travel of about 0.125 inch–0.750 inch, that greater or lesser degrees of travel could be readily accommodated with only slight modifications to the components of the apparatus 10. Furthermore, the main body 48 and the guide portion 50 are preferably anodized to provide surfaces which are highly resistant to wear and therefore contribute to the durability of apparatus 10.

It will therefore be appreciated that the apparatus 10 of the present invention provides a bearingless, mechanical, rotary fluid coupling which not only can be used with dedicated machine tools but also with flexible machine tools which require a small degree of travel of a spindle thereof. The apparatus 10, through its polygonal-shaped recess 94 and polygonal-shaped shoulder 86, further permits a small degree of axial misalignment of the spindle 12 relative to the plunger 80 to maintain a fluid-tight seal therebetween. Since the apparatus 10 is not physically secured to the spindle 12 and does not rotate with the spindle 12, the apparatus 10 does not experience nearly the same degree of vibration experienced by conventional couplings.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A fluid-tight coupling apparatus for passing fluid between a rotatable member mounted for rotation about an axis and a non-rotatable member, said apparatus comprising:
    a guide member having a polygonal recess formed therein;
    a main body portion;
    a tubular plunger having a polygonal shoulder portion protruding from an outer surface thereof, said polygonal shoulder portion having outer dimensions sightly less than said polygonal recess to permit said polygonal shoulder portion to move linearly, slidably within said polygonal recess, said polygonal recess further having a depth sufficient to permit at least about 0.125 inch of linear travel of said plunger within said polygonal recess;
    a biasing member disposed inbetween said plunger and said main body to provide a biasing force to urge said plunger into a fully extended position once said guide portion is secured to said main body and yet permit said plunger to be retracted against said biasing force at least about 0.125 inch; and
    wherein said polygonal recess and said polygonal shoulder portion of said plunger cooperate to permit a degree of axial movement of said plunger caused by axial misalignment of said rotatable member or said apparatus when said apparatus is coupled to said rotatable member without affecting a fluid-tight seal between said apparatus and rotatable member.

2. The apparatus of claim 1, wherein said polygonal shoulder portion comprises a generally square shape with each corner thereof rounded off.

3. The apparatus of claim 1, further comprising a sealing washer disposed between said main body portion and said polygonal shoulder of said plunger.

4. The apparatus of claim 1, further comprising an elastomeric sealing ring disposed inbetween said main body portion and said plunger.

5. The apparatus of claim 1, further comprising:
    a spring disposed within said main body portion, said spring having an inner diameter sufficient to accept a portion of the length of said plunger;
    a steel sealing washer having an aperture of sufficient diameter to allow said portion of said plunger to pass therethrough; and
    said main body portion having an interior shoulder portion against which a first end portion of said spring seats, a second end portion of said spring abutting an end of said plunger to provide said biasing force tending to bias said plunger into said extended position once said guide member is secured to said main body portion.

6. The apparatus of claim 1, wherein said main body portion includes a housing portion, a neck portion and a polygonal end portion, said polygonal end portion facilitating coupling of said main body portion to a fluid supply hose, and said housing portion including a plurality of apertures; and
    said guide member including a plurality of apertures formed so as to align with said apertures in said housing portion of said main body portion when said guide member is secured to said main body to thereby permit a plurality of external fastening elements to secure said guide member to said main body portion.

7. A fluid type coupling apparatus for passing fluid between a rotatable member mounted for rotation about an axis and a non-rotatable member, said apparatus comprising:
    a main body having a neck portion, and a housing portion with a bore extending longitudinally through said housing and neck portions, said main body being adapted to be secured to a fluid supply line such that fluid can be supplied through said main body;
    a biasing member disposed within said main body;
    an elongated plunger having a tubular body and a polygonal shoulder extending generally perpendicularly from said tubular body about at least a portion of the circumference of said tubular body; and
    a guide member having a bore extending therethrough of sufficient dimension to permit passage therethrough of a portion of said tubular body of said plunger once said guide member is secured to said main body;
    said biasing member biasing said plunger into a fully extended position and permitting retraction of said plunger over a distance of at least about 0.125 inch; and
    wherein said polygonal shoulder portion of said plunger further has dimensions permitting said plunger to move slidably within said polygonal recess in said guide member without rotation within said guide member yet permitting a small degree of axial movement of said plunger to accommodate slight misalignment between said rotatable member and said apparatus without affecting a fluid-tight seal between said rotatable member and said apparatus.

8. The apparatus of claim 7, wherein said polygonal shoulder portion of said plunger comprises a generally square shape; and wherein said polygonal shoulder portion has at least one corner rounded off to help facilitate slight axial movement of said plunger within said polygonal recess of said guide member.

9. The apparatus of claim 7, further comprising a steel sealing washer disposed between said main body and said polygonal shoulder portion.

10. The apparatus of claim 9, wherein said housing portion of said main body includes a recess of sufficient dimensions to accept said sealing washer; and wherein said aperture in said sealing washer is of sufficient dimension to permit passage of said spring therethrough.

11. A fluid type coupling apparatus for passing fluid between a rotating spindle and a non-rotating fluid supply line, said apparatus comprising:

a guide member having an aperture opening into a polygonal recess;

a main body having a bore extending therethrough, a first end of said main body being adapted to be secured to said guide member and a second end of said main body being adapted to be secured to said fluid supply line;

an elongated plunger having a bore extending therethrough and a laterally protruding polygonal shoulder portion formed on an outer surface thereof, said polygonal shoulder portion being of dimensions sufficiently small to permit insertion thereof within said polygonal recess such that said polygonal shoulder portion is able to slide longitudinally within said polygonal recess and to move axially to accommodate at least a small degree of axial misalignment of said plunger relative to said spindle, said polygonal recess further being formed at a point along the length of said plunger to permit said plunger to travel slidably, longitudinally within said polygonal recess at least about 0.125 inch before engaging a bottom most surface of said polygonal recess; and a biasing member disposed within said main body for providing a biasing force to said plunger to maintain said plunger in a normally fully extended position and for enabling said plunger to be slidably retracted toward said second end a distance of at least about 0.125 inch.

12. The apparatus of claim 11, wherein said polygonal shoulder portion of said plunger includes a plurality of rounded off corner portions to further facilitate axial movement of said polygonal shoulder portion within said polygonal recess.

13. The apparatus of claim 12, wherein said polygonal shoulder portion comprises a generally square shape; and wherein said polygonal recess comprises a generally square shape.

14. A fluid type coupling apparatus for passing fluid between a rotatable spindle and a non-rotating fluid supply line, said apparatus comprising:

a first body portion having a bore therethrough and a recessed area, said recessed area opening adjacent a first end of said body portion and a second end of said body portion being adapted to be coupled to said fluid supply line;

a tubular, elongated plunger having an outwardly extending, polygonal-shaped shoulder circumscribing an outer surface of said elongated plunger; said outer surface being of dimensions permitting slidable, longitudinal travel of said elongated plunger at least partially within said bore in said first body portion;

a second body portion securable to said first body portion, said second body portion having a bore extending axially therethrough from a first end thereof and a polygonal-shaped recess formed in a second end thereof, said polygonal-shaped recess being of dimensions permitting said polygonal-shaped shoulder portion to be supported within said polygonal-shaped recess and to move slidably, axially therewithin;

a biasing member disposed within said first body portion and adapted to provide a biasing force against said elongated plunger to maintain said plunger in an extended position and permit said plunger to be retracted at least about 0.125 inch by an external force applied by said spindle when said spindle moves axially towards said apparatus.

15. The apparatus of claim 14, wherein said polygonal-shaped shoulder comprises a plurality of corners which are rounded to facilitate a small degree of axial movement of said plunger when said polygonal-shaped shoulder is positioned within said polygonal-shaped recess.

16. The apparatus of claim 15, wherein said polygonal-shaped shoulder comprises a generally square shape.

17. The apparatus of claim 14, further comprising a sealing washer having an aperture sufficiently large to permit passage therethrough of at least a portion of the length of said plunger;

said washer having outer dimensions permitting insertion thereof into said recess formed in said first end of said first body portion.

* * * * *

UNITED STATES PATENT AND TRADEMARK OFFICE
CERTIFICATE OF CORRECTION

PATENT NO. : 5,716,080
DATED : February 10, 1998
INVENTOR(S) : James F. Kaleniecki It is certified that error appears in the above-identified patent and that said Letters Patent is hereby corrected as shown below:

Column 3, Line 47, insert --the coupling apparatus in accordance with directional line-- after "of" (second occurrence).

Column 5, Line 12, delete "64" and insert --65--.

Column 5, Line 17, delete "64" and insert --65--.

Column 6, Line 34, "most" should be --must--.

Column 7, Line 48, "sightly" should be --slightly--.

Signed and Sealed this

Twelfth Day of May, 1998

Attest:

BRUCE LEHMAN

*Attesting Officer*  *Commissioner of Patents and Trademarks*